United States Patent
Xie et al.

(10) Patent No.: US 11,968,048 B2
(45) Date of Patent: Apr. 23, 2024

(54) METHOD AND APPARATUS FOR PERFORMING DATA PACKET RETRANSMISSION IN WIRELESS COMMUNICATION SYSTEM

(71) Applicant: ZTE CORPORATION, Guangdong (CN)

(72) Inventors: Feng Xie, Guangdong (CN); Tao Qi, Guangdong (CN); Liping Wang, Guangdong (CN); Guanghui Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 373 days.

(21) Appl. No.: 17/387,605

(22) Filed: Jul. 28, 2021

(65) Prior Publication Data
US 2021/0359793 A1 Nov. 18, 2021

Related U.S. Application Data (63) Continuation of application No. PCT/CN2019/074637, filed on Feb. 2, 2019.

(51) Int. Cl.
*H04B 7/00* (2006.01)
*H04L 1/1812* (2023.01)

(52) U.S. Cl.
CPC .................. *H04L 1/1812* (2013.01)

(58) Field of Classification Search
CPC .... H04L 1/1812; H04W 84/18; H04W 76/02; H04W 28/04; H04W 28/00
USPC ........................................................ 370/310
See application file for complete search history.

(56) References Cited

U.S. PATENT DOCUMENTS

| | | | |
|---|---|---|---|
| 2009/0046626 A1 | 2/2009 | Shao | |
| 2010/0223522 A1* | 9/2010 | Duggan | H04L 1/0021 714/E11.131 |
| 2013/0332803 A1 | 12/2013 | Hamada | |

(Continued)

FOREIGN PATENT DOCUMENTS

| | | |
|---|---|---|
| CN | 103199954 A | 7/2013 |
| CN | 107734547 A | 2/2018 |

(Continued)

OTHER PUBLICATIONS

3GPP, 3GPP TS 38.300 VI5.4.0, 3rd Generation Partnership Project; Technical Specification Group Radio Access Network; NR; "NR and NG-RAN Overall Description"; Stage 2 (Release 15), Dec. 31, 2018 (Dec. 31, 2018), 97 pages.

(Continued)

*Primary Examiner* — Temica M Beamer
(74) *Attorney, Agent, or Firm* — Duane Morris LLP (57) ABSTRACT

A method and apparatus for data retransmission in a wireless communication network, specifically, for a data packet generation before retransmission, according to available resources, link status, and the like is disclosed. In one embodiment, a method for a data packet retransmission by a wireless communication device, includes: receiving first information from a wireless communication node, wherein the first information comprises a first indicator; and performing a data packet retransmission with a data packet generation according to the indicator.

20 Claims, 6 Drawing Sheets

(56) References Cited

U.S. PATENT DOCUMENTS

| | | | | |
|---|---|---|---|---|
| 2015/0365198 | A1* | 12/2015 | Tabet | H04L 1/1812 370/329 |
| 2016/0073391 | A1* | 3/2016 | Awad | H04L 1/1864 370/329 |
| 2016/0080133 | A1* | 3/2016 | Golitschek Edler von Elbwart | H04W 76/28 370/280 |
| 2017/0214489 | A1 | 7/2017 | Jiang et al. | |
| 2018/0323906 | A1 | 11/2018 | Nammi | |
| 2019/0074936 | A1 | 3/2019 | Lee | |
| 2019/0268930 | A1* | 8/2019 | Rudolf | H04W 72/569 |

FOREIGN PATENT DOCUMENTS

| | | |
|---|---|---|
| CN | 108347295 A | 7/2018 |
| CN | 108781141 A | 11/2018 |
| CN | 108933642 A | 12/2018 |
| WO | 2017034096 A1 | 3/2017 |
| WO | 2017194733 A1 | 11/2017 |
| WO | 2018002410 A1 | 1/2018 |

OTHER PUBLICATIONS

ZTE "Consideration on scheduling enhancement for NB-IoT", 3GPP TSG RAN WG1 Meeting #94bis, R1-1812775, Spokane, USA; Nov, 12, 2018-Nov. 16, 2018, Nov. 11, 2018 (Nov. 11, 2018), 8 pages.

Fujitsu "Grouped and Encoded Packet based HARQ for LTE-Advanced", 3GPP TSG-RAN1 #55Bis, R1-090385, Ljubljana, Slovenia; Jan. 12, 2009, Jan. 8, 2009 (Jan. 8, 2009), 11 pages.

Shrcwc "An efficient and robust HARQ-ARQ Interaction scheme", 3GPP TSG-RAN WG2 Meeting #55, R2-062783, Seoul, Korea; Oct. 5, 2006, Oct. 5, 2006 (Oct. 5, 2006), 6 pages.

* cited by examiner

METHOD AND APPARATUS FOR PERFORMING DATA PACKET RETRANSMISSION IN WIRELESS COMMUNICATION SYSTEM

TECHNICAL FIELD

This disclosure relates generally to wireless communications and, more particularly, to a method and apparatus for data packet retransmission in a wireless communication network, specifically, for a data packet generation before retransmission, according to available resources, link status, and the like.

BACKGROUND

A HARQ (Hybrid automatic repeat request) process of the MAC (Medium Access Control) layer, and an ARQ (Automatic repeat request) process of the RLC (Radio Link Control) layer are two important techniques for achieving high data transmission robustness at the air interface in a cellular communication system. The HARQ process enables a fast and efficient data retransmission in lower layers when a data transmission fails; while the ARQ process enables a data retransmission on the RLC layer when the HARQ process fails, in RLC acknowledge mode (AM). Generally, in a downlink (DL) transmission, the HARQ of the MAC layer is configured and performed by a base station. On the other hand, in an uplink (UL) transmission in a Long-Term Evolution (LTE) system, the HARQ is configured and indicated by the base station through a Physical channel HARQ Indicator Channel (PHICH) and potential Downlink Control Information (DCI) in a Physical Downlink Control Channel (PDCCH) when resources for an UL transmission are explicitly allocated, which enables a synchronization, non-adaptive or adaptive data retransmission; and in an UL transmission in a New Radio (NR) system, the HARQ is configured by DCI which can enable a flexible, asynchronous and adaptive data retransmission.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

A HARQ mechanism determines whether a data retransmission is performed for a certain Transport Block (TB) through a HARQ feedback from a receiver (e.g., ACK/NACK). When a data retransmission fails after performing a number of HARQ processes, an ARQ process is initiated on the RLC layer, when AM in the RLC layer is enabled, until the data retransmission on the RLC layer is successful or the radio link fails. A delay on the user plane can be introduced due to a delay of the RLC state packet and a delay of the data retransmission. When an UL power is limited, the performance of the ARQ feedback data transmission on the RLC layer is low, resulting in a low throughput in the DL transmission when AM in the RLC layer is enabled. For example, in a dual-connectivity (DC) with a limited uplink power, e.g., E-UTRAN-NR DC (EN-DC) or NR-E-UTRA DC (NE-DC), a service is transmitted in AM mode in the ARQ process. Although the HARQ feedback can be successfully received, the ARQ feedback information of the RLC layer may be received unsuccessfully, leading to a deleterious DL data transmission. Therefore, there exists a need to develop a method and apparatus for enhanced data retransmission process for a fast data packet generation and retransmission in a HARQ process.

In one embodiment, a method for a data packet retransmission by a wireless communication device, includes: receiving first information from a wireless communication node, wherein the first information comprises a first indicator; and performing a data packet retransmission with a data packet generation according to the indicator.

In a further embodiment, a method for a data packet retransmission by a wireless communication node, includes: transmitting first information to a wireless communication device, wherein the first information comprises a first indicator, wherein the first indicator is used to indicate a data packet retransmission with a data packet generation.

In another embodiment, a method for a data packet retransmission by a wireless communication device, includes: receiving a message from a wireless communication node, wherein the message comprises at least one configuration; receiving first information from the wireless communication node, wherein the first information comprises an indicator; and performing a data packet retransmission with a data packet generation according to the at least one configuration and the indicator.

In another embodiment, a method for a data packet retransmission by a wireless communication node, includes: transmitting a message to a wireless communication device, wherein the message is used to determine at least one configuration; and transmitting first information to the wireless communication device, wherein the first information comprises an indicator, wherein the at least one configuration and the indicator are used to indicate a data packet retransmission with a data packet generation.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

Figure 1A:
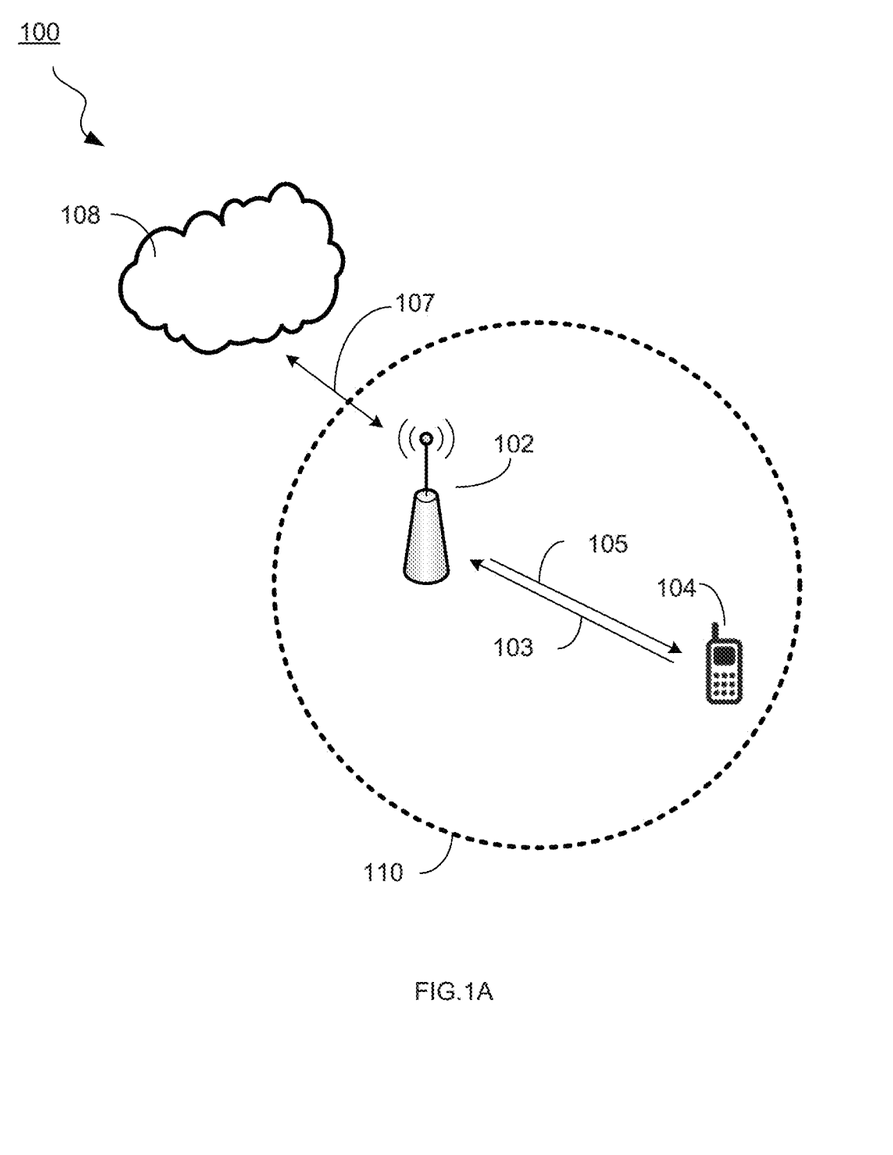
FIG. 1A illustrates an exemplary wireless communication network, in accordance with some embodiments of the present disclosure.

FIG. 1A illustrates an exemplary wireless communication network 100, in accordance with some embodiments of the present disclosure. In a wireless communication system, a network side communication node can be a node B, an E-UTRA Node B (also known as Evolved Node B, eNodeB or eNB), a gNodeB (also known as gNB) in new radio (NR) technology, a pico station, a femto station, a wireless access point (AP) in wireless local area network (WLAN), or the like. A terminal-side communication device can be a long range communication system like a mobile phone, a smart phone, a personal digital assistant (PDA), tablet, laptop computer, or a short range communication system such as, for example a wearable device, a vehicle with a vehicular communication system, a wireless station (STA) in wireless local area network (WLAN), and the like. A network communication node and a terminal-side communication device are represented by a BS 102 and a UE 104, respectively, and in all the embodiments in this disclosure hereafter, and are generally referred to as "wireless communication nodes" and "wireless communication device" herein. Such wireless communication nodes and devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a BS 102, and a UE 104. In some embodiments, the UE 104 forms direct communication (i.e., uplink) channels 103 with the BS 102. In some embodiments, the UE 104 also forms direct communication (i.e., downlink) channels 105 with the BS 102, respectively. The direct communication channels between the UE 104 and the BS 102 can be through interfaces such as an Uu interface, which is also known as E-UTRA air interface. In some embodiments, the UE 104 comprises a plurality of transceivers which enables the UE 104 to support connectivity so as to receive data from the BS 102. The BS 102 is connected to a core network (CN) 108 through an external interface 107, e.g., an Iu interface, or an NG interface. In some other embodiments, a serving cell 110 is covered by the BS 102.

Figure 1B:
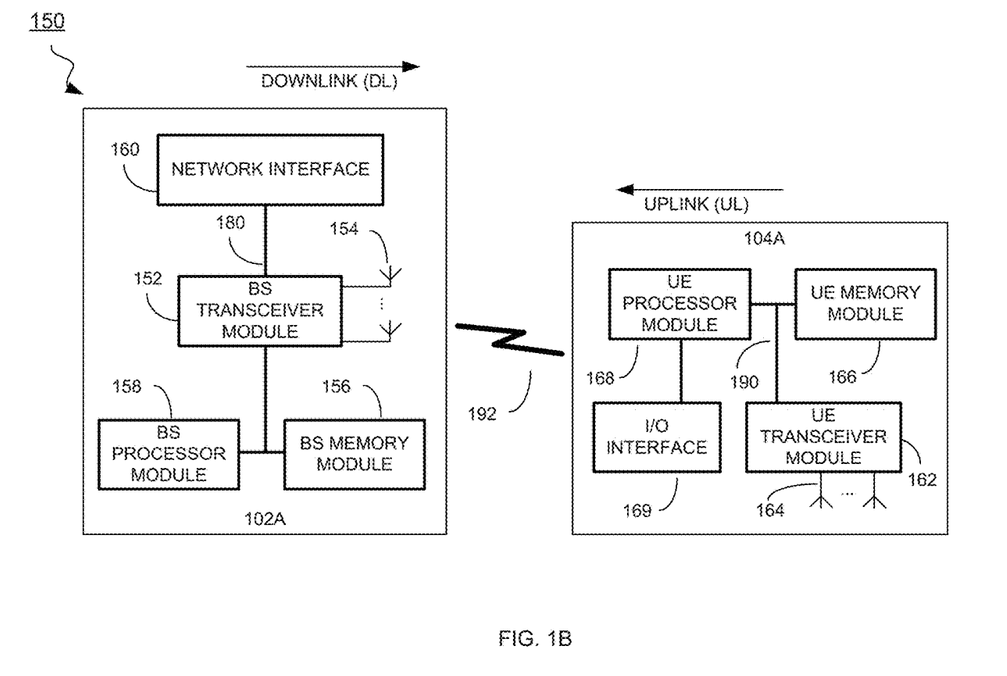
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a BS 102, and a UE 104. The BS 102 comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates with the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to the UE 104 so as to allow the UE 104 to access the network within the cells (e.g., a serving cell 110 for the BS 102) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
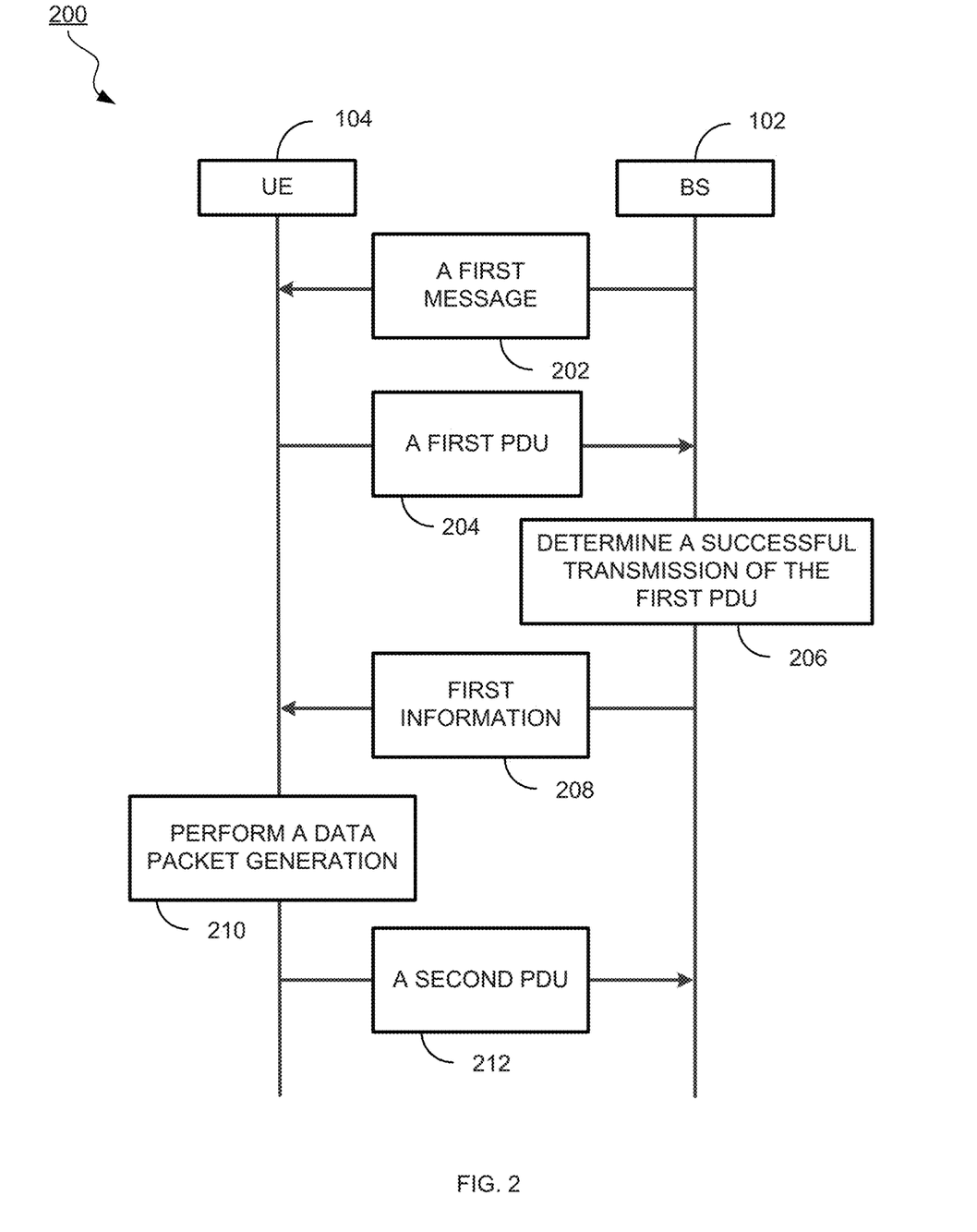
FIG. 2 illustrates a method for a data packet retransmission in a wireless communication system in accordance with some embodiments of the present disclosure.

FIG. 2 illustrates a method 200 for determining a data retransmission in a wireless communication system in accordance with some embodiments of the present disclosure. In some embodiments, the data packet retransmission is a part of a HARQ process. It is understood that additional operations may be provided before, during, and after the method 200 of FIG. 2, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 200 starts with operation 202 in which a first message is transmitted by the BS 102 to the UE 104 according to some embodiments. In some embodiments, the first message is a separated Radio Resource Control (RRC) message before data transmission, which is transmitted after the UE 104 attaches to the BS 102 or during an exchanging of capability information between the UE 104 and the BS 102. In some embodiments, the first message is configured to enable the UE 104 for a data packet retransmission with a data packet generation.

The method 200 continues with operation 204 in which a first Protocol Data Unit (PDU) is received by the BS 104 from the UE 104 according to some embodiments. In some embodiments, the first PDU comprises at least one first Transport Block (TB), wherein the at least one first TB each comprises at least one uplink (UL) data packet. In some embodiments, the first PDU is received on Physical Uplink Shared Channel (PUSCH).

The method 200 continues with operation 206 in which a successful transmission of the first PDU is determined by the BS 102 according to some embodiments. In some embodiments, after receiving the first PDU, the BS 102 performs a data packet checking according to a predefined checking mechanism. When the data packet checking fails, the reception of the first PDU from the UE 104 is determined as failed by the BS 102. In some embodiments, when the first PDU is not received within a time period defined by a timer, the reception of the first PDU from the UE 104 is determined as failed by the BS 102. In some embodiments, when the reception of the first PDU is determined as failed by the BS 102, the BS 102 further determines an UL resource allocation and an MCS order so as to configure a data packet generation by forming at least one second TB. In some other embodiments, when the UL resource allocation and the MCS order are not determined by the BS 102, allocated UL resources successfully received in a previous data service by the UE 104 can be further used and the MCS order can be changed according to configurations by the UE 104.

The method 200 continues with operation 208 in which first information is transmitted by the BS 102 to the UE 104 according to some embodiments. In some embodiments, the first information comprises Downlink Control Information (DCI). In some embodiments, the first information comprises a data packet retransmission indicator. In some embodiments, the data packet retransmission indicator is configured for explicitly indicating whether a data packet retransmission with a data packet generation is required. In some embodiments, the data packet retransmission indicator can be one of the following: a specific data packet generation indictor field in the first information and an extended New Data Indicator (NDI). In some embodiments, a specific data packet generation indictor field is a 1 bits indicator following an NDI indicator. For example, a value 0 indicates that the retransmission; a value of 1 indicates a retransmission with a data generation is required. In some embodiments, the extended NDI is a 2-bit indicator. For example, a value 00 of the extended NDI in the first information indicates that the first PDU with at least one first TB in a HARQ process with a HARQ process ID of i is successfully received by the BS 102; a value of 01 of the extended NDI indicates that a data packet retransmission without a data packet generation is required for the HARQ process with a HARQ process ID of i; and a value of 10 or 11 of the extended NDI indicates that a data packet retransmission with a data packet generation is required for the UE 104 to perform a data packet generation and to form a second TB in the HARQ process with a HARQ process ID of i or in another HARQ process ID other than i.

In some embodiments, the first information further comprises the UL resource allocation and the MCS order. In some other embodiments, the first information does not comprises the UL resource allocation or the MCS order. In some embodiments, the UL resource allocation and the MCS order are determined by the BS 102 according to one of the following: previous measurement results of the UE 104, latest measurement results of the UE 104, and status of resources for the UL transmission.

In some embodiments, when the UL resource allocation or the MCS order is not included in the first information, the allocated UL resources last successfully received by the UE 104 or the MCS order last successfully received by the UE 104 in the transmission of the at least one first TB in the HARQ process can be used. In some embodiments, when neither the UL resources allocation nor the MCS order is included in the first information, the MCS order can be determined according to a pre-determined rule and the allocated UL resources last successfully received by the UE 104 can be reused. In some embodiments, the pre-determined rule is known by the BS 102 and the UE 104.

In some embodiments, the first information comprises an indicator transmitted through a special Acknowledgement/Negative-Acknowledgement (ACK/NACK) channel. In some embodiments, the indicator comprises extended ACK/NACK information with at least 2 bits. For example, a value 00 of the extended ACK/NACK information indicates a successful reception and no retransmission is needed; a value of 01 of the extended ACK/NACK information indicates a failed reception and a retransmission without a data packet generation is needed; a value of 10 or 11 of the extended ACK/NACK information indicates that a retransmission with a data packet generation is needed. In some embodiments, the UL resource allocation and MCS order is not explicitly indicated in the first information, and an MCS order, which is different from the last successfully received MCS order by the UE 104 (e.g., higher or a lower) is used by UE 104 according to a pre-determined rule. In some embodiments, a data packet generation method is determined by the UE 104 according to the allocated UL resources last successfully received by the UE 104 and the MCS order. In some embodiments, the UL resource allocation and MCS order can be transmitted from the BS 102 to the UE 104 in separate information, wherein the separate information comprises DCI.

The method 200 continues with operation 210 in which a data packet generation process is performed by the UE 104 according to some embodiments. In some embodiments, the operation 210 is performed when a data packet retransmission indicator is received in the first information from the BS 102 indicating that a data packet retransmission with a data packet generation is required. In some embodiments, the data packet generation is configured by the UE 104 according to a data packet generation method so as to form the at least one second TB, wherein the data packet generation method is determined by the UE 104 according to the UL resource allocation and the MCS order, wherein the UL resource allocation is one of the following: transmitted to the UE 104 from the BS 102 (e.g., in the first information or the separate information), and determined according to a previous UL resource allocation successfully received by the UE 104 from the BS 102, and wherein the MCS order is one of the following: transmitted to the UE 104 from the BS 104 (e.g., in the first information or the separate information), determined according to a previously MCS order successfully received by the UE 104 from the BS 102, and determined according to a pre-determined rule. In some embodiments, the data packet generation method is discussed in further detail below in FIGS. 3A-3B.

Figure 3A:
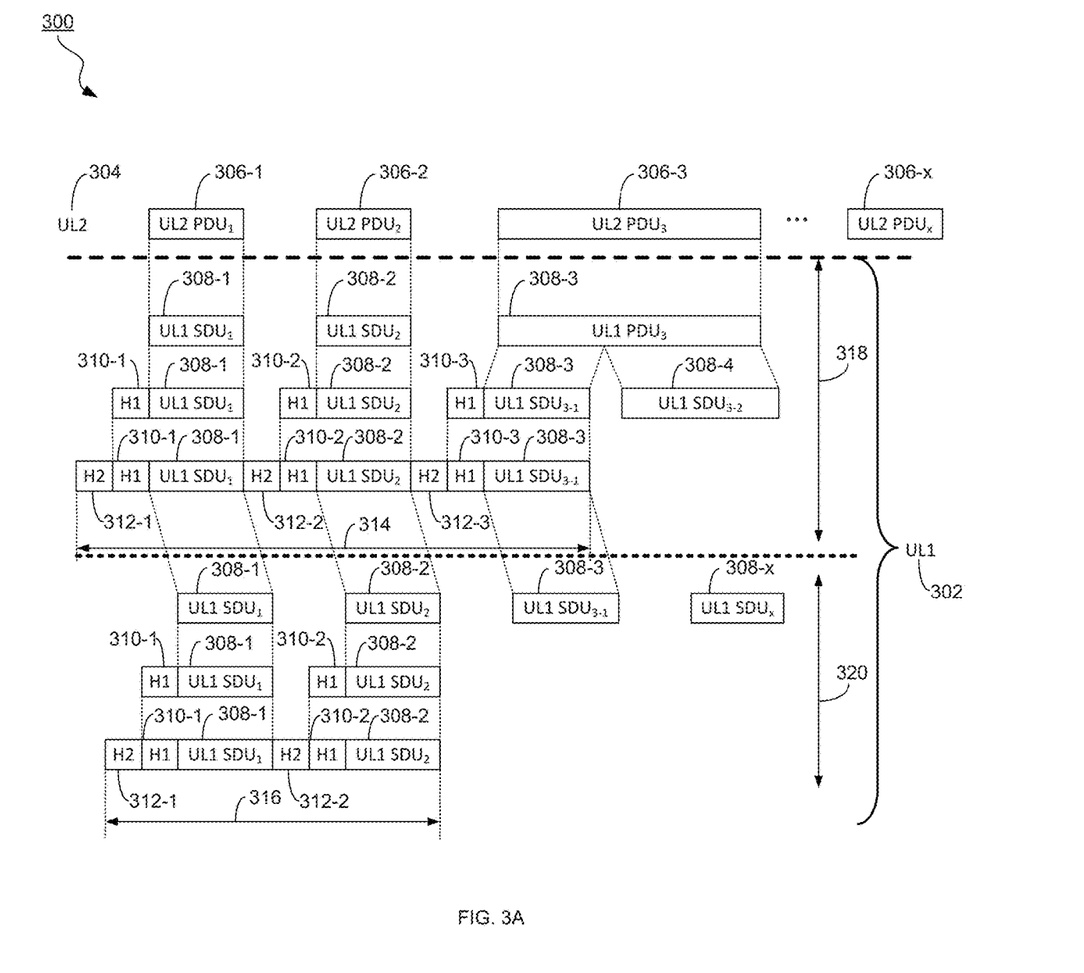
FIG. 3A illustrates a data packet generation method for a HARQ retransmission process, in accordance with some embodiments of the present disclosure.

FIG. 3A illustrates a data packet generation method 300 for a HARQ retransmission process, in accordance with some embodiments of the present disclosure. In the illustrated embodiment, the method 300 comprises protocol stack layers above a Physical layer of an Air-interface protocol stack, i.e., a first protocol stack layer UL1 302 and a second protocol stack layer UL2 304. In some embodiments, functions of the first protocol stack layer UL1 302 and the second protocol stack layer 304 correspond to functions of at least one layer of the actual protocol stack. In some embodiments, the first protocol stack layer UL1 302 comprises one of the following: a MAC layer and combined MAC/RLC layers. In some embodiments, the second protocol stack layer UL2 304 comprises at least one layer above the MAC layer.

In the illustrated embodiments, the second protocol stack layer UL2 304 has a plurality (x) of UL2 Protocol Data Units (PDUs) (UL2 PDU) as its outputs, e.g., UL2 PDU1 306-1, UL2 PDU2 306-2, UL2 PDU3 306-3, . . . , and UL2 PDUx 306-x. In the illustrated embodiment, a plurality of UL2 PDUs at the output of the second protocol stack layer UL2 304 is transmitted to the first protocol stack layer UL1 302 as inputs. In some embodiments, the inputs of the first protocol stack layer UL1 302 comprises a plurality (y=4) of UL1 Service Data Units (SDUs) (UL1 SDU) in a first scheduling period (e.g., N), i.e., UL1 SDU1 308-1, UL1 SDU2 308-2, and UL1 SDU3-1 308-3. In some embodiments, the UL1 SDU3-1 308-3 and the UL1 SDU3-2 308-4 are segmented from the UL2 PDU3 in the UL2 layer. In the illustrated embodiments, a first header, i.e., H1, can be added to each of the UL1 SDU. Specifically, a first header H1 310-1 is added to the UL1 SDU1 308-1; a first header H1310-2 is added to the UL1 SDU2 308-2; and a first header H1310-3 is added to the UL1 SDU3 308-3. In the illustrated embodiments, to form a first transport block (TB) 314, a second header i.e., H2, can be further added to each of the UL1 SDU with the first header H1. Specifically, a second header H2 312-1 is added before the first header H1 310-1 of the UL1 SDU1; a second header H2 312-2 is added before the first header H1310-2 of the UL1 SDU2; and a second header H2 312-3 is added before the first header H1310-3 of the UL1 SDU3. In the illustrated embodiments, the first TB 314 during the first scheduling period (N) of a HARQ process comprises 3 UL1 SDUs or SDU segments and six headers. In some embodiments, the first header H1 comprises segmentation information, and the second header H2 comprises at least one of the following: logic channel identity information and a packet length.

When a data packet retransmission with a data packet generation process is determined to be performed on the first TB 314 scheduled in the first scheduling period 318, at least a second TB 316 can be formed from multiplexing parts or all of the UL1 SDUs or segments in the first TB 314 in a second scheduling period 320 (N+n), wherein n is a positive integer. In some embodiments, the UL1 SDU1 and the UL1 SDU2 are created by adding the first header H1 310 to each of the UL1 SDU1 and UL1 SDU2. Specifically, the first header H1 310-1 is added to the UL1 SDU1; and the first header H1 310-2 is added to the UL1 SDU2. In the illustrated embodiments, to form the second TB 316, the second header H2 312 is added each of the first header H1 310. Specifically, the second header H2 312-1 is added before the first header H1 310-1 of the UL1 SDU1; and the second header H2 312-2 is added before the first header H1 310-1 of the UL1 SDU2. In the illustrated embodiments, the second TB 316, comprising two UL1 SDUs or segments and 4 headers, is smaller than the first TB 314. In some embodiments, a UL1 SDUx 308-x is scheduled to be transmitted in the second scheduling period 320. In some embodiments, the first header H1 in the first scheduling period 318 can be different from the first header H1 in the second scheduling period 320; and the second header H2 in the first scheduling period 318 can be different from the second header H2 in the second scheduling period 320. In some embodiments, the first headers H1 (i.e., H1 310-1, H1 310-2, and H1 310-3) in a same scheduling period (i.e., the first scheduling period 318 or the second scheduling period 320) can be different; and the second headers H2 (i.e., H2 312-1, H2 312-2, and H2 312-3) in a same scheduling period (i.e., the first scheduling period 318 or the second scheduling period 320) can be different.

Figure 3B:
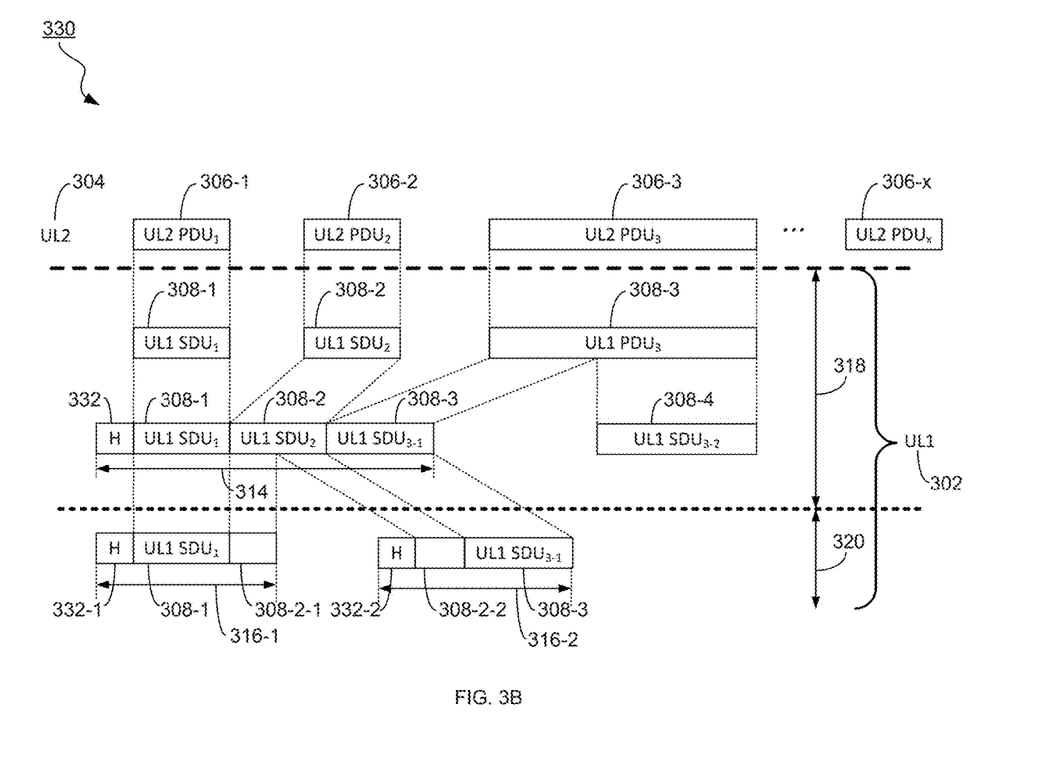
FIG. 3B illustrates a data packet generation method for a HARQ retransmission process, in accordance with some embodiments of the present disclosure.

FIG. 3B illustrates a data packet generation method 330 for a HARQ retransmission process, in accordance with some embodiments of the present disclosure. In the illustrated embodiment, the method 300 comprises 2 protocol stack layers above a Physical layer of an Air-interface protocol stack, i.e., a first protocol stack layer UL1 302 and a second protocol stack layer UL2 304. In some embodiments, functions of the first protocol stack layer UL1 302 and the second protocol stack layer 304 correspond to functions of at least one layer of the actual protocol stack. In some embodiments, the first protocol stack layer UL1 302 comprises one of the following: a MAC layer and combined MAC/RLC layers. In some embodiments, the second protocol stack layer UL2 304 comprises at least one above the MAC layer.

In the illustrated embodiments, the second protocol stack layer UL2 304 has a plurality (x) of UL2 Protocol Data Units (PDUs) (UL2 PDU) as its outputs, e.g., UL2 PDU1 306-1, UL2 PDU2 306-2, UL2 PDU3 306-3, . . . , and UL2 PDUx 306-x. In the illustrated embodiment, the plurality of UL2 PDUs at the output of the second protocol stack layer UL2 304 is transmitted to the first protocol stack layer UL1 302 as inputs. In some embodiments, the UL1 SDU3-1 308-3 and the UL1 SDU3-2 308-4 are segmented from the UL2 PDU3 in the UL1 layer. In some embodiments, a plurality (y=3) of UL1 Service Data Units (SDUs) (UL1 SDU) in a first scheduling period (e.g., N), i.e., UL1 SDU1 308-1, UL1 SDU2 308-2, and UL1 SDU3-1 308-3 are multiplexed to form a first TB 314, and a header 332, i.e., H, is added to the multiplexed result. In the illustrated embodiments, the first TB 314 during the first scheduling period (N) of a HARQ process comprises 3 UL1 SDUs or SDU segments and 1 header. In some embodiments, the header H comprises at least one of the following: segmentation information and logic channel identity information.

When a data packet retransmission with a data packet generation process is determined to be performed on the first TB 314 scheduled in the first scheduling period 318, at least a second TB 316 can be generated from multiplexing parts or all of the UL SDUs or SDU segments in the first TB 314 in a second scheduling period 320 (N+n), wherein n is a positive integer. In the illustrated embodiments, one of the UL1 SDUs is re-segmented to at least 2 SDU segments, which can be then multiplexed together with other UL1 SDUs to form the at least one second TB 316 in the second scheduling period 320. Specifically, the UL1 SDU2 308-2 is re-segmented into 2 SDU segments, i.e., a first UL1 SDU2-1 308-2-1 and a second UL1 SDU2-2 308-2-2. The first UL1 SDU2-1 308-2-1 together with the UL1 SDU1 308-1 and a header 332 before the UL1 SDU1 are multiplexed to form a second TBs 316-1. Similarly, the second UL1 SDU2-2 308-2-2 together with the UL1 SDU3-1 308-3 and the header 332 before the second UL1 SDU2-2 308-2-2 are multiplexed to form a second TBs 316-2. In some embodiments, two second TB 316 according to the method 330 are generated. In some embodiments, the header H in the first scheduling period 318 can be different from the header H in the second scheduling period 320. In some embodiments, the headers H (i.e., H 332-1, and H 332-2) in the second scheduling period can be different.

The method 200 continues with operation 212 in which a second PDU is received by the BS 102 from the UE 104 according to some embodiments. In some embodiments, the second PDU comprises the at least one second TB formed according to the data packet generation method for the data packet retransmission. In some embodiments, the second PDU is transmitted on the PUSCH.

Figure 4:
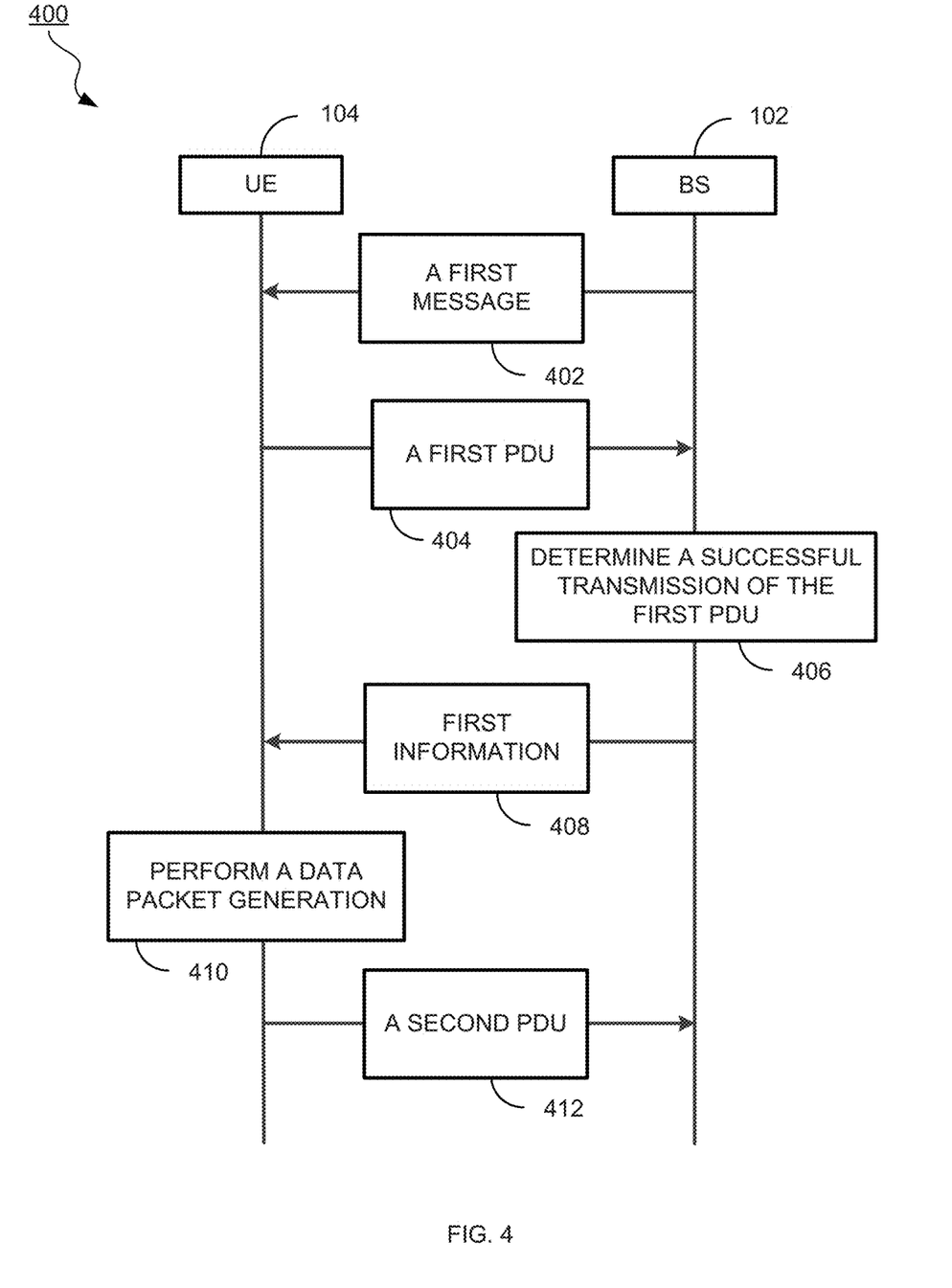
FIG. 4 illustrates a method for a data packet retransmission in a wireless communication system in accordance with some embodiments of the present disclosure.

FIG. 4 illustrates a method 400 for a data packet retransmission in a wireless communication system in accordance with some embodiments of the present disclosure. In some embodiments, the data packet retransmission is a part of a HARQ process. It is understood that additional operations may be provided before, during, and after the method 400 of FIG. 4, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 400 starts with operation 402 in which a first message is transmitted by the BS 102 to the UE 104 according to some embodiments. In some embodiments, the first message is a Radio Resource Control (RRC) message. In some embodiments, the first message further comprises at least one configuration for at least one parameter, which is configured to indicate a condition for a data packet generation process. In some embodiments, the at least one parameter comprises a maximum number of a data packet retransmission process without a data packet generation. In some embodiments, such data packet retransmission is a part of a HARQ process. In some other embodiments, the maximum number of a data packet retransmission process without a data packet generation is determined according to one of the following: a link property and a service property. In some embodiments, the link property comprises at least one of the following: Quality of Service (QoS) information and a Protocol Data Unit (PDU) session property. In some embodiments, the service property comprises an Ultra-Reliable Low-Latency Communication (URLLC) service property.

The method 400 continues with operation 404 in which a first Protocol Data Unit (PDU) is received by the BS 104 from the UE 104 according to some embodiments. In some embodiments, the first PDU comprises at least one first Transport Block (TB), wherein the at least one first TB each comprises at least one UL data packets. In some embodiments, the first PDU is received on a Physical Uplink Shared Channel (PUSCH).

The method 400 continues with operation 406 in which a successful transmission of the first PDU is determined by the BS 102 according to some embodiments. In some embodiments, after receiving the first PDU, the BS 102 performs a data packet checking according to a predefined checking mechanism. When the data packet checking fails, the reception of the first PDU from the UE 104 is determined as failed by the BS 102. In some embodiments, when the first PDU is not received within a time period defined by a timer, the reception of the first PDU from the UE 104 is determined as failed by the BS 102. In some embodiments, when the reception of the first PDU is determined as failed by the BS 102, and the condition in the first message is satisfied, the BS 102 further determines an UL resource allocation and an MCS order so as to configure a data packet generation by forming at least one second TB. In some other embodiments, the UL resource allocation or the MCS order is not determined by the BS 102. In this case, the allocated UL resources successfully last received by the UE 104 can be re-used and the MCS order can be changed according to a predetermined rule by the UE 104.

The method 400 continues with operation 408 in which first information is transmitted by the BS 102 to the UE 104 according to some embodiments. In some embodiments, the first information comprises DCI. In some embodiments, the first information comprises a data packet retransmission indicator. In some embodiments, the data packet retransmission indicator is configured for explicitly indicating whether a data packet retransmission is required. In some embodiments, the data packet retransmission indicator can be a New Data Indicator (NDI). In some embodiments, the NDI is a 1-bit indicator. In some embodiments, if the condition in the first message is satisfied, and a value 0 of the NDI in the first information indicates that a data packet retransmission with data packet generation is required; a value of 1 of the NDI indicates that the data reception is successful, and no retransmission is needed.

In some embodiments, the first information comprises the UL resource allocation and the MCS order. In some other embodiments, the first information does not comprises the UL resource allocation or the MCS order. In some embodiments, the UL resource allocation and the MCS order are determined by the BS 102 according to one of the following: previous measurement results of the UE 104, latest measurement results of the UE 104, and status of resources for the UL transmission. In some embodiments, when the UL resource allocation or the MCS order is not included in the first information, the allocated UL resources last successfully received by the UE 104 or the MCS order last successfully received by the UE 104 in the transmission of the at least one first TB in the HARQ process can be used. In some embodiments, when neither the UL resource allocation nor the MCS order is included in the first information, the MCS order can be determined according a predetermined rule and the allocated UL resources last successfully received by the UE 104 can be reused. In some embodiments, the predetermined rule is known by the BS 102 and the UE 104.

The method 400 continues with operation 410 in which a data packet generation process is performed by the UE 104 according to some embodiments. In some embodiments, the operation 410 is performed when the condition for a data packet generation process is satisfied. In some embodiments, the data packet generation is configured by the UE 104 according to a data packet generation method so as to form the at least one second TB, wherein the data packet generation method is determined by the UE 104 according to the UL resource allocation and the MCS order, wherein the UL resource allocation is one of the following: transmitted to the UE 104 from the BS 102 (e.g., in the first information), and determined according to a previous UL resource allocation successfully received by the UE 104 from the BS 102, and wherein the MCS order is one of the following: transmitted to the UE 104 from the BS 104 (e.g., in the first information), determined according to a previous MCS order successfully received by the UE 104 from the BS 102, and determined according to a pre-determined rule. In some embodiments, the data packet generation method is discussed in further detail above in FIGS. 3A-3B.

The method 400 continues with operation 412 in which a second PDU is received by the BS 102 from the UE 104 according to some embodiments. In some embodiments, the second PDU comprises the at least one second TB formed according to the data packet generation method for the data packet retransmission. In some embodiments, the second PDU is transmitted on the PUSCH.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for a data packet retransmission by a wireless communication device, comprising:
receiving first information from a wireless communication node, wherein the first information comprises a first indicator;
determining a data packet generation method according to an uplink (UL) resource allocation and a Modulation Coding Scheme (MCS) order, wherein the MCS order is determined according to a pre-determined rule when neither the UL resource allocation nor the MCS order is included in the first information; and
performing a data packet retransmission with a data packet generation according to the indicator, wherein the data packet generation is configured according to the data packet generation method.

2. The method of claim 1, wherein the first information comprises Downlink Control Information (DCI), wherein the first indicator in the first information is one of the following: a specific data packet generation indicator field and an extended New Data Indicator (NDI), and wherein the extended NDI comprises at least 2 bits.

3. The method of claim 1, wherein the first information comprises extended Acknowledgement/Negative-Acknowledgement (ACK/NACK) information, wherein the ACK/NACK information comprises at least 2 bits.

4. The method of claim 1, wherein the data packet generation comprises at least one of the following: data packet segmentation, data packet re-segmentation, and data packet multiplexing.

5. The method of claim 1, further comprising:
prior to the receiving, receiving a first message from the wireless communication node;
wherein the first message is a Radio Resource Control (RRC) message, and wherein the first message is configured to enable the wireless communication device for the data packet retransmission with the data packet generation.

6. The method of claim 1,
wherein the UL resource allocation is one of the following: received in the first information, received in second information, and determined according to a previous UL resource allocation, and wherein the MCS order is one of the following: received in the first information, received in the second information, and determined according to a previous MCS order, wherein the second information comprises DCI.

7. A method for a data packet retransmission by a wireless communication node, comprising:
transmitting first information to a wireless communication device, wherein the first information comprises a first indicator,
wherein the first indicator is used to indicate a data packet retransmission with a data packet generation configured according to a data packet generation method, wherein the data packet generation method is determined by the wireless communication device according to an uplink (UL) resource allocation and a Modulation Coding Scheme (MCS) order, wherein the MCS order is determined according to a pre-determined rule when neither the UL resources allocation nor the MCS order is included in the first information.

8. The method of claim 7, wherein the first information comprises Downlink Control Information (DCI), wherein the first indicator in the first information is one of the following: a specific data packet generation indicator field and an extended New Data Indicator (NDI), and wherein the extended NDI comprises at least 2 bits.

9. The method of claim 7, wherein the first information comprises an extended Acknowledgement/Negative-Acknowledgement (ACK/NACK) information, wherein the ACK/NACK information comprises at least 2 bits.

10. The method of claim 7, wherein the data packet generation comprises at least one of the following: data packet segmentation, data packet re-segmentation, and data packet multiplexing.

11. The method of claim 7, further comprising:
prior to the transmitting, transmitting a first message to the wireless communication device; wherein the first message is a Radio Resource Control (RRC) message, and wherein the first message is configured to enable the wireless communication device for the data packet retransmission with the data packet generation.

12. The method of claim 7, wherein the UL resource allocation is one of the following: transmitted to the wireless communication device in the first information, transmitted to the wireless communication device in second information, and determined according to a previously UL resource allocation, and wherein the MCS order is one of the following: transmitted to the wireless communication device in the first information, transmitted to the wireless communication device in the second information, and determined according to a previously MCS order, wherein the second information comprises DCI.

13. A method for a data packet retransmission by a wireless communication device, comprising:
- receiving a message from a wireless communication node, wherein the message comprises at least one configuration;
- receiving first information from the wireless communication node, wherein the first information comprises an indicator;
- determining a data packet generation method according to an uplink (UL) resource allocation and a Modulation Coding Scheme (MCS) order, wherein the MCS order is determined according to a pre-determined rule when neither the UL resources allocation nor the MCS order is included in the first information; and
- performing a data packet retransmission with a data packet generation according to the at least one configuration and the indicator, wherein the data packet generation is configured according to the data packet generation method.

14. The method of claim 13, wherein each of the at least one configuration is one of the following: a condition and an index of a condition for indicating a data packet generation.

15. The method of claim 13, wherein the at least one configuration comprises a maximum number of data packet retransmissions without a data packet generation.

16. The method of claim 13, wherein the at least one configuration is determined according to at least one of the following: a session property, a service property, and a slice identification (ID).

17. The method of claim 16, wherein the session property comprises at least one of the following: a Quality of Service information, and a PDU session property, and wherein the service property comprises an Ultra-Reliable Low-Latency Communication (URLLC) service property.

18. The method of claim 13, wherein the message is a Radio Resource Control (RRC) message, and wherein the first information comprises Downlink Control Information (DCI).

19. The method of claim 13, wherein the indicator is configured to indicate whether the data packet retransmission is required, and wherein the indicator is a New Data Indicator (NDI).

20. The method of claim 13,
- wherein the UL resource allocation is one of the following: received in the first information, and determined according to a previous UL resource allocation, and wherein the MCS order is one of the following: received in the first information, and determined according to a previous MCS order.

* * * * *